United States Patent
Teraslinna

(10) Patent No.: US 7,065,569 B2
(45) Date of Patent: Jun. 20, 2006

(54) SYSTEM AND METHOD FOR REMOTE TRAFFIC MANAGEMENT IN A COMMUNICATION NETWORK

(75) Inventor: Kari T. Teraslinna, Petaluma, CA (US)

(73) Assignee: Turin Networks, Inc., Petaluma, CA (US)

( * ) Notice: Subject to any disclaimer, the term of this patent is extended or adjusted under 35 U.S.C. 154(b) by 843 days.

(21) Appl. No.: 09/764,486

(22) Filed: Jan. 9, 2001

(65) Prior Publication Data

US 2002/0107857 A1    Aug. 8, 2002

(51) Int. Cl.
G06F 15/173    (2006.01)
(52) U.S. Cl. .................... 709/223; 370/230.1; 370/230
(58) Field of Classification Search ................ 709/238, 709/241, 239, 232, 223, 228; 370/256, 352, 370/230.1, 231
See application file for complete search history.

(56) References Cited

U.S. PATENT DOCUMENTS

| | | | | |
|---|---|---|---|---|
| 5,933,425 A | * | 8/1999 | Iwata | .......................... 370/351 |
| 6,147,987 A | * | 11/2000 | Chau et al. | .................. 370/352 |
| 6,278,705 B1 | * | 8/2001 | Chau et al. | .................. 370/352 |
| 6,496,567 B1 | * | 12/2002 | Bjornberg et al. | ....... 379/88.02 |
| 6,512,740 B1 | * | 1/2003 | Baniewicz et al. | .......... 370/216 |

OTHER PUBLICATIONS

Vuppala et al, Layer-3 Swichtign Using Virtual network Port, IEEE 1999.*
Vuppala et al, Virtual Network Port: An Inter-networking Switching Framework, Sep. 29, 1998.*
Vibhavasu Vuppala and Lionel M. Ni, *Layer-3 Switching Using Virtual Network Ports*, Computer Communications and Networks, 1999, pp. 642-648, East Lansing, MI.
Cisco Systems, Inc., *Virtual Trunking and Traffic Shaping on BPX 8600 Series*, 1999, pp. 1-10.

* cited by examiner

*Primary Examiner*—Abdullahi Salad
(74) *Attorney, Agent, or Firm*—Blakely, Sokoloff, Taylor & Zafman LLP

(57) ABSTRACT

A traffic manager to manage flows to a plurality of remote physical ports. The traffic manager employs two tiers of shaping and scheduling driven by performance characteristics of the remote physical ports. By modeling the remote physical ports within the traffic manager, flows to the physical ports can be controlled to arrive at a rate the physical ports can handle. Any backup that would otherwise occur in the queue at the physical ports is instead queued in the traffic manager. In this manner, the intelligence of the traffic manager can be leveraged to provide improved quality of service with existing infrastructure.

4 Claims, 3 Drawing Sheets

SYSTEM AND METHOD FOR REMOTE TRAFFIC MANAGEMENT IN A COMMUNICATION NETWORK

BACKGROUND (1) Field of the Invention

The invention relates to network communications. More specifically, the invention relates to traffic management in a network.

(2) Background

Downstream internet traffic flows on oversubscribed copper lines at rates DS-1 and below dominate the performance attributes of internet applications. Large carriers have been deploying frame relay access switches since the early nineties. ILECs and CLECs have deployed large footprints of first generation digital subscriber line access multiplexers (DSLAMs). Likewise, Internet service providers (ISP's) and cable operators have a large embedded base of legacy routers, hubs and cable modem termination systems (CMTS). These deployments have resulted in a large embedded base of legacy equipment with very limited traffic management features. Typical queuing systems are FIFO based and often a FIFO is shared across lines allowing customers to interfere with each other. One result of this FIFO queuing is that two flows directed to the same line may not be delivered in desirable order. For example, a packet or cell of a web page download or e-mail may be delivered in advance of packet or cell of the next video frame.

Bandwidth demands are continually increasing. This ever-growing demand for bandwidth necessitates traffic management techniques. While existing "last mile" infrastructure creates a performance bottleneck for downstream traffic flows, the cost of replacing this existing legacy equipment would be very high. It is useful to add traffic management capabilities to the network without replacing the legacy equipment.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
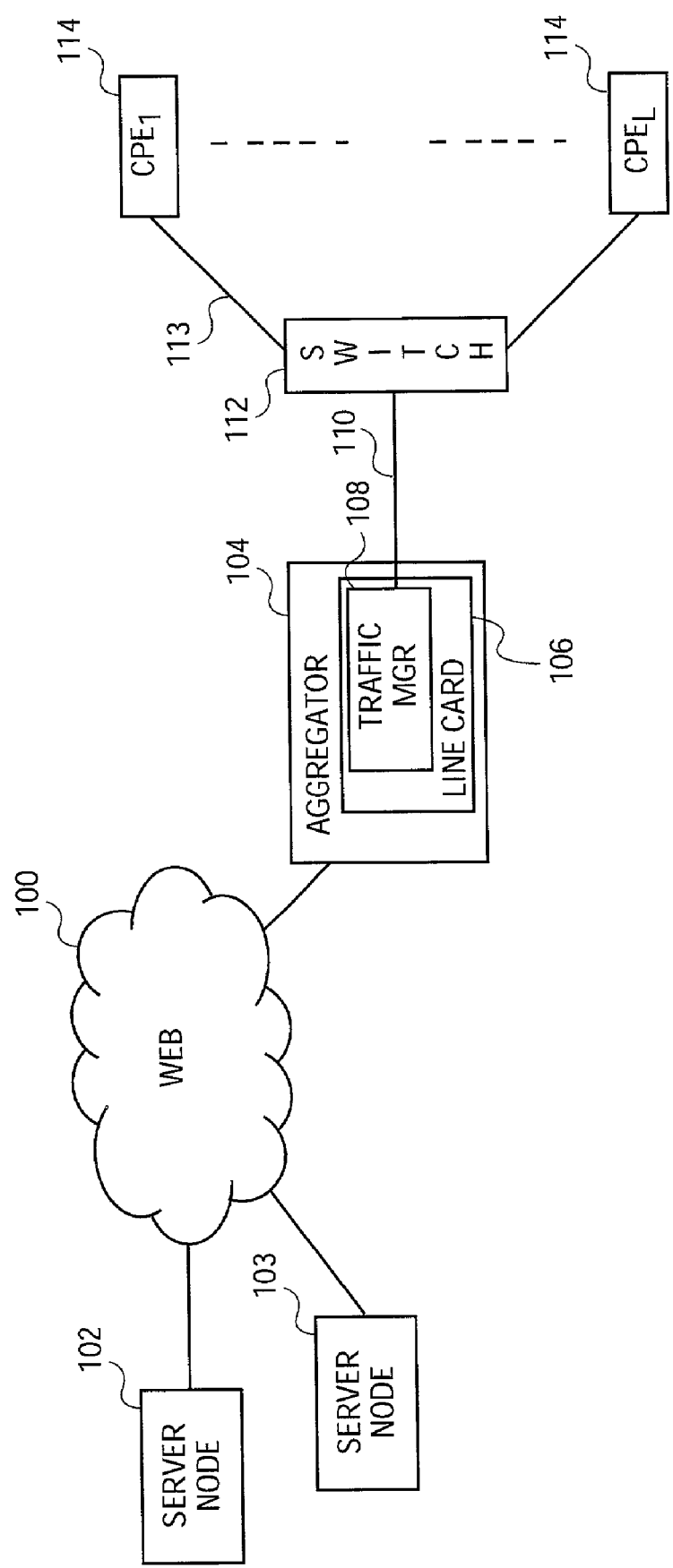
FIG. 1 is a block diagram of a system of one embodiment of the invention.

FIG. 1 is a block diagram of a system of one embodiment of the invention. Server nodes 102 and 103 may be any server nodes that might exist on the world wide web. Such server nodes may stream audio, stream video, serve web pages, serve e-mail, or provide other types of data across a distributed network, such as web 100, through an aggregator 104 across a trunk line 110 through a switch 112 to a line 113 and finally to customer premise equipment (CPE) 114. Trunk line 110 may be any broadband communication link, for example, a DS-3 or an OC-3 line. Flows from aggregator 104 through the switch 112 toward CPE 114 are regarded as downstream flows. Typically, downstream flows originate at a server node such as server node 102. Frequently, switch 112 has very limited traffic management capabilities. Aggregator 104 includes a line card 106 having a traffic manager 108 thereon.

The traffic manager 108 implements a model of the physical line rate of the line 113 of the switch 112. The model includes a traffic shaper which limits traffic destined to that port to that line rate. By modeling the physical bit rate of the lines of the switch 112, the traffic manager 108 knows when the incoming traffic from such servers as 102 and 103 at the aggregator destined for a particular line of the switch 112 exceeds the line rate for that line. When it does, even instantaneously, the traffic manager 108 only sends packets or cells to the switch 112 at that line rate, queuing the excess traffic within the traffic manager 108. Within the traffic manager 108, sophisticated traffic management capabilities may be invoked to control the individual flows destined for line 113. For example, video packets received from server 102 may be sent out before an e-mail received from server 103. In addition, only low priority packets may be discarded according to some packet discard policy when queues reach a certain queue threshold.

As long as the legacy switch 112 does not receive traffic for a particular port at a bit rate greater than the port is able to carry, nothing is queued at the FIFO buffers of the legacy switch 112. The traffic manager may insure that the legacy switch 112 only receives a new packet or cell from the aggregator when the previous packet or cell has already been sent out on the line 113. Accordingly aggregator 104 becomes the only place where traffic management occurs. The legacy switch 112 becomes transparent to traffic management because traffic to the line 113 is already managed at the upstream aggregator 104 and the legacy switch 112 adds no queuing delay to any packets or cells. The aggregator 104 can thus be said to remotely manage the traffic of the legacy switch 112. In one embodiment, the traffic manager is implemented on an ASIC.

Figure 2:
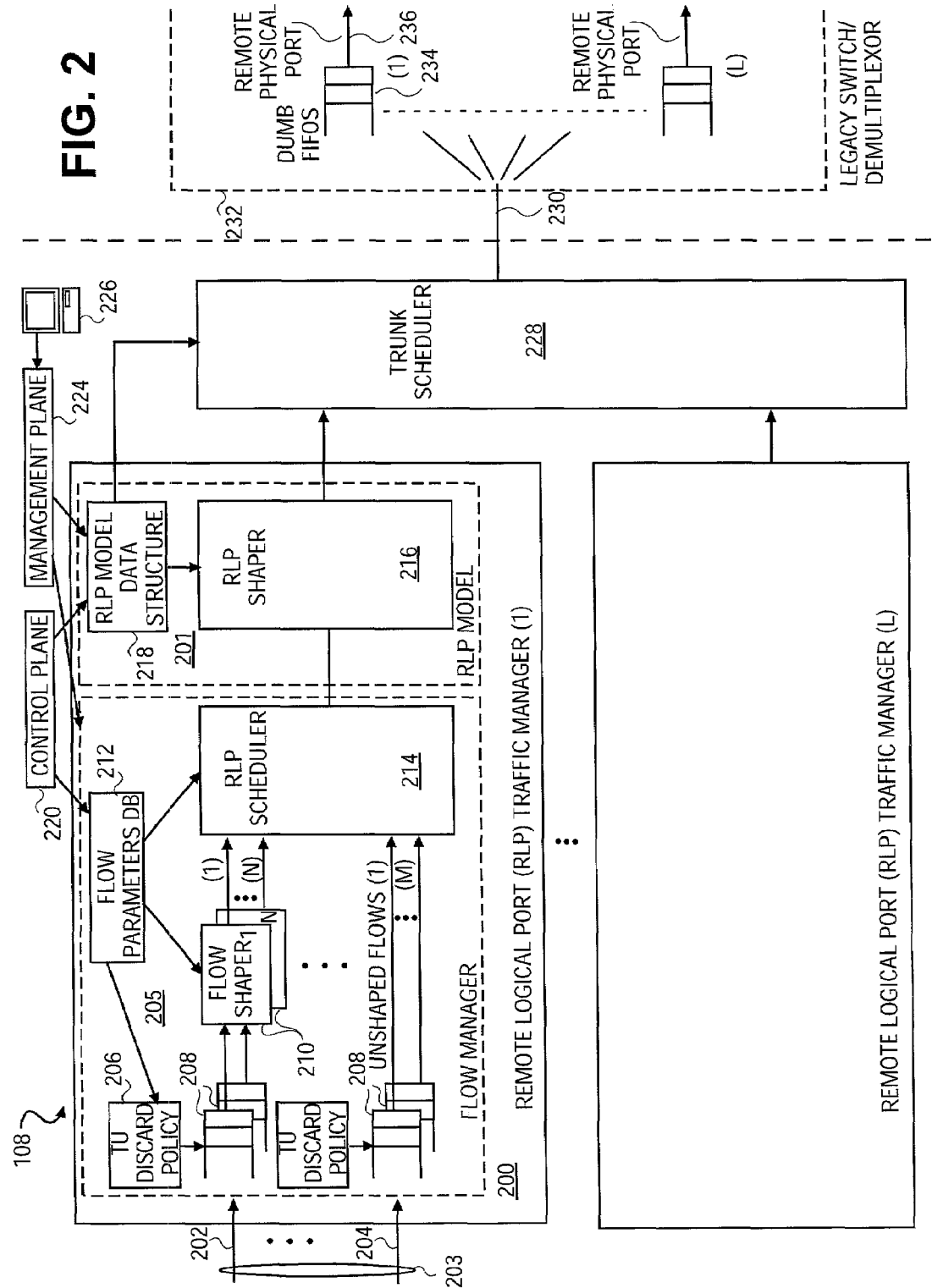
FIG. 2 is a block diagram of an aggregator and remote physical ports networked thereto in one embodiment of the invention.

FIG. 2 is a block diagram of an aggregator and remote physical ports networked thereto in one embodiment of the invention. At the network edge is a legacy switch or demultiplexer 232 which has a plurality of remote physical ports (RPPs) 236. Each such port operates at a particular transfer rate. For example, remote ports may operate at DS-1 rates or below. A FIFO 234 associated with port 236 is provided in the event that the incoming rate on the trunk 230 exceeds the RPPs transfer rate. Subsequent data would typically be queued in the FIFO. A legacy switch or demultiplexer 232 distributes incoming transmission units from the trunk line 230 to the appropriate RPP. By way of example, the trunk line 230 may be a DS-3 connection which implies it has 28 times the capacity of a DS-1.

A remote logical port (RLP) traffic manager 108 consists of a flow manager 109 followed by a RLP model 201. Thus, where there are L physical ports, where L is an arbitrarily large positive integer, there will be L RLP traffic managers 200, L flow managers 205 and L RLP models 201, resulting in a one-to-one correspondence. L is expected to be rather large, such that the aggregate bandwidth of the L RPPs is much greater than the capacity of the trunk. All flows directed to a particular remote physical port are handled by its corresponding RLP traffic manager. The RLP traffic manager 200 is for remote RPP 236. The RPP model 201 may receive N flows 202 of packets or cells, containing such information as streamed video or audio, and, for example, M flows 204 of packets or cells, containing such information as a web page download or e-mail.

In the subsequent discussion, packets, frames or cells are referred to as transmission units. Illustratively, a transmission unit may be, for example and without limitation, a layer 3 packet which may have a variable length, a layer 2 frame with a variable length, or an asynchronous transfer mode (ATM) cell which has a fixed length. Illustratively, flows are a sequence of transmission units associated with a particular customer, a particular connection, or a particular application such as video, or a combination of such associations.

The function of the flow manager 205 is to provide better bandwidth management of traffic flows than are provided at the elegacy switch 232. Better bandwidth management is accomplished by providing more features capable of differentiating the flow characteristics of flows than are available at the legacy switch. The following are illustrative of flow management. Instead of a shared FIFO queue 234 for all flows, a queue 208 is provided for each incoming flow 202, 204. Transmission unit discard policies 206 may be applied to the buffers of both shaped and unshaped flows 202, 204. An example of a discard policy may be: "if queues containing video information are at least ¼ full and queues containing e-mail information are at least ⅔ full, discard the last transmission unit containing e-mail information from its queue." Flows containing video or audio streaming information may be advantageously shaped in a flow shaper 210. The flow shaper 210 smoothes the flow of transmission units for reception by a CPE device like a PC. By "shaping," it is meant that the eligibility of a transmission unit for transmission is determined by the time elapsed since the transmission of the previous transmission unit from that flow. Both shaped and unshaped flows may then scheduled for transmission. For example, a transmission unit in a queue containing video information may be scheduled for transmission ahead of a transmission unit in a queue containing e-mail information. All the flows, both shaped and unshaped, are scheduled by RLP scheduler 214. Shaped flows may be given higher priority than unshaped flows. When thus prioritized, if at any time, the sum of the flow exceeds the RPP rate, e.g. DS-1, unshaped flow will backup in the queues of the traffic manager, while shaped flows are handled on a best efforts basis. The RLP scheduler 214 presents a transmission unit of the most urgent flow to the RLP model.

In one embodiment of the invention, once the individual flows are controlled using some or all of the traffic management techniques described above, the next scheduled transmission unit of a flow is presented to the RLP model to further determine eligibility for transmission. The function of the RLP model is to determine when the transmission unit is eligible to be presented to the trunk scheduler. The RLP model includes an RLP shaper and an RLP model data structure 218. The RLP data structure 218 is loaded with shaping parameters that correspond to the transmission rate, r, of the RPP. In one embodiment, the RLP shaper 216 assures that the transmission unit is made eligible for trunk scheduling no sooner than after an elapsed time, t, since the last transmission unit for that RPP was transmitted on the trunk. The elapsed time $t=s/r$, where $s=$the size of the previous transmission unit (in bits) and $r=$the rate of the RPP in bits/second. This is simply the duration it takes to transmit a transmission unit on the RPP.

The parameter r is a variable obtained by provisioning from the management plane 224. The parameter s is stored in the database with each transmission unit sent. It may also be constant as in the case of fixed length ATM cells. The trunk scheduler also feeds back a parameter, T, which is the time at which the previous transmission unit destined for the RPP was actually transmitted on the trunk. It is also stored in the data structure 218 until the next transmission unit for that RPP is transmitted. It is within the scope and contemplation of the invention to use parameters such as the inverse of a rate to calculate eligibility time of the transmission unit. The RLP model 201 assures that the RPP will be able to transmit the previous transmission unit out on the line before the next transmission unit arrives.

Each of these RLP model parameters are associated with a RLP in the data structure 218. Any transmission unit destined for a particular RPP is associated with an RLP. The RLP may be identified from the transmission unit headers by various methods. One method is to assign a unique connection identifier to all traffic destined for a particular RPP. For example an ATM VPI or MPLS label may identify the RLP. The individual flows then may be identified by IP addresses encapsulated within the MPLS packet or ATM cell. Or in another embodiment, the flows are identified with virtual circuit identifiers (VCIs), while the RLP is identified with a virtual path identifier (VPI). In yet another embodiment, a VCI identifies a flow for processing in the flow manager 205, and a multitude of VCIs identify the RLP. This may be accomplished by looking up a VCI in a lookup table (LUT) (not shown) to find an associated RLP identifier. Multiple VCIs all going to the same destination RPP will have the same RLP identifier associated with them. A second lookup of the RLP identifier in a second LUT will find the shaping parameters associated with the RLP. These are but a few of the many ways to distinguish flows and RLPs from transmission unit headers.

Flow shaper 210 forms its shaping based on flow parameters from flow parameter database 212 as described. The flow parameter database 212 may be populated by a control plane 220. Control plane 220 is basically a connection or flow manager that receives connection or flow policy information from the signaling network or from the management plane. Control plane 220 includes a connection admission control (CAC) that matches inflows with downstream bandwidth. In one embodiment of the invention, the CAC ignores the RLP structure and merely subtracts the transmission rate of incoming flows from the available outgoing transmission rate of the trunk. This method enables the trunk 230 to achieve statistical gain. In other words it operates in a work conserving manner at least some or most of the time.

The RLP shaper 216 shapes the scheduled flow established by the RLP scheduler 214. Shaping by the RLP shaper 216 is based on, for example, legacy port rates provided by the RLP model data structure 218. RLP model data structure 218 may be populated by the management plane 224 as described above. Population of the RLP model database 218 may be by direct entry from a manager via user interface device 226. Alternatively, management protocol, such as simple network management protocol (SNMP) could be used to query port management information buffer (MIB) in the legacy switch for port information and corresponding transmission rate, sometimes implied by the type of port. For example, if the type of port is DS-1, then it implies a transmission rate of 1.544 Mb/s. Scripts could be used to automate the queries and collect responses, and further, could then be used to automatically populate the RLP model data structure 218.

Each RLP model indicates eligibility of its shaped flow to the trunk scheduler 228. In one embodiment, flow is only deemed eligible if sending a transmission unit will not cause a backup in the downstream queue. This can be determined based on the port rate and the timing of a previous transmission as explained above.

The trunk scheduler 228 schedules a trunk flow from the set of eligible transmission units of all the remote logical ports. In one embodiment, the transmission units are scheduled in a work conserving way for the trunk. It is expected that relatively few RLP are subject to shaping simultaneously. The other flows can fill up the trunk to make it work-conserving. By statistically multiplexing, the trunk scheduler 228 is able to supply many more physical ports than the trunk capacity alone would permit. Both levels of shaping and scheduling may be performed using pointer manipulation within the queuing structures that receive the flows.

The above described a hierarchical dual level shaping and scheduling system at an upstream traffic manager node that permits flows to be individually shaped and scheduled such that a downstream flow at the port of a legacy switch, router or network provides a quality of service that the port's own traffic management facilities could not guarantee. This allows legacy equipment to appear to have traffic management capability where it is not present. Accordingly, the capital cost of replacing such equipment to achieve the desired quality of service may be avoided. Remote traffic management could be provided to hundreds or even thousands of RPPs using just one traffic manager which might only be one or a couple of ASICs on an aggregator line card.

While the discussion above relates to a legacy switch, this is merely illustrative. Particularly, a frame relay switch, ATM switch, Ethernet hub, router, cable modem termination system (CMTS) or even a network of these elements, may be modeled and managed as discussed above. By way of additional example, for a network of elements having significant trunking capacity, assuming the data bottlenecks in a last line leading out of the network, that line can be modeled as the RPP. It is also within the scope and contemplation of the invention to employ additional levels of shaping and scheduling, particularly where a downstream network is to be modeled.

Figure 3:
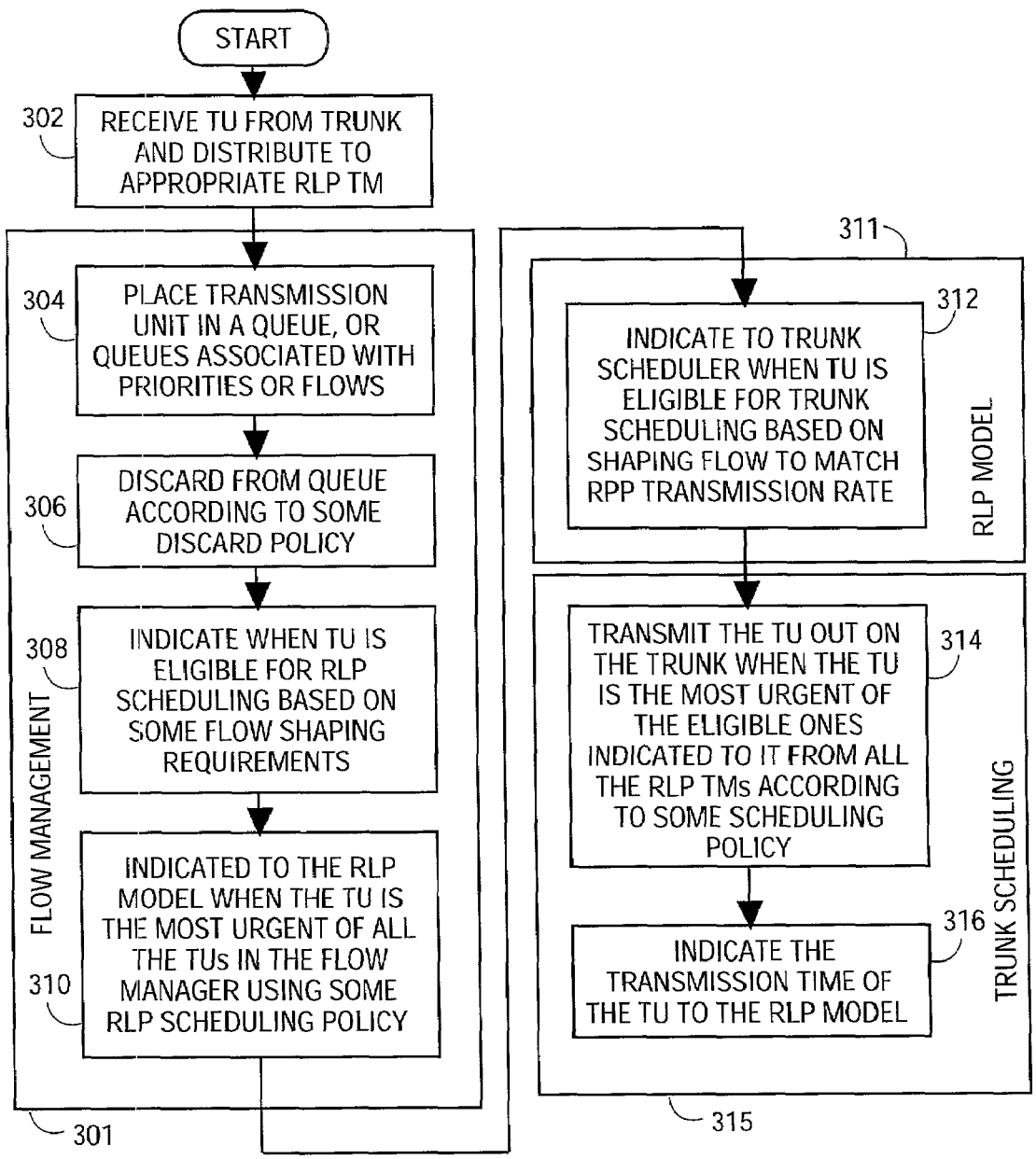
FIG. 3 is a generalized flow diagram of traffic management in one embodiment of the invention.

FIG. 3 is a generalized flow diagram of traffic management in one embodiment of the invention. At functional block 302 a transmission unit is received from an incoming trunk and distributed to an appropriate RLP traffic manager. Block 301 corresponds to flow management within a traffic manager. At functional block 304 the transmission unit (TU) is placed in a queue associated with a particular priority or flow. At functional block 306 TUs are discarded from the queue or queues according to some discard policy that is able to differentiate between the discard rates of at least two flows. A TU is indicated to be eligible for RLP scheduling once it has satisfied some flow-shaping requirements at functional block 308. The particular requirements may be arbitrarily established, and may include any known or subsequently developed flow-shaping techniques.

At functional block 310 the most urgent TU is indicated to the RLP model based on RLP scheduling policy. The RLP flow scheduling policy, like the flow-shaping requirements, may be an arbitrary scheduling policy. Box 311 corresponds to the operation within the RLP model. At functional block 312, the eligibility of the most urgent TU is determined based on shaping the flow to match the RPP transmission rate.

One or more, but not necessarily all of the blocks 304, 306, 308, and 310 may be used to provide better traffic management than the legacy switch, depending on the QoS features of the legacy switch.

Box 315 corresponds to operation at the trunk scheduler. At functional block 314, when the TU for the RLP model is eligible, and the most urgent of all the TU's from all the RLP traffic managers based on the established trunk scheduling policy, the TU is transmitted out and the transmission time of the TU is reported back to the RLP model at functional block 316. The trunk scheduling policy may vary in sophistication from one embodiment to the next. For example, in one embodiment the trunk scheduling may be simple, first in first out (FIFO). Nevertheless provided that more sophisticated management is used in the traffic manager, improved quality of service is provided to the RPPs. Alternatively, sophisticated scheduling policies may be implemented by the trunk scheduler in addition to any other policies applied upstream.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A system comprising:
a broadband communication link;
a demultiplexer coupled to a plurality of physical ports and the broadband communication link; and
a network element coupled to the communication link, the network element modeling the plurality of physical ports and providing a two-tier hierarchy of shaping and scheduling of flows directed to the plurality of physical ports, the network element including a first flow shaper to shape a plurality of flows directed to a remote physical port (RPP), a first scheduler to schedule the flows shaped by the first flow shaper to yield a scheduled flow, a second flow shaper to shape the scheduled flow, and a trunk scheduler to schedule the flow shaped by the second flow shaper for transmission to the RPP.

2. The system of claim 1 further comprising:
a plurality of data structures populated with data indicating characteristics of a remote physical port (RPP); and
a database populated with flow parameters.

3. The system of claim 2 wherein a one-to-one correspondence exists between RLP data structures and RPPs.

4. The system of claim 1 wherein the network element comprises:
a queue for each flow directed at a physical port and wherein shaping and scheduling are performed by pointer manipulation.

* * * * *